US012803076B2

(12) United States Patent
Vazirani et al.

(10) Patent No.: US 12,803,076 B2
(45) Date of Patent: Nov. 17, 2026

(54) POWDER MIXTURE FOR HEAT DISSIPATION AND COMPONENTS HAVING THE POWDER MIXTURE

(71) Applicant: VAZIRANI ENERGY PRIVATE LIMITED, Mumbai (IN)

(72) Inventors: Chandan Vazirani, Mumbai (IN); Apoorv Singh, Bokaro Steel City (IN); Atharva Suyog Kulkarni, Mumbai (IN); Vaibhav Mittal, Ghaziabad (IN)

(73) Assignee: VAZIRANI ENERGY PRIVATE LIMITED (IN)

( * ) Notice: Subject to any disclaimer, the term of this patent is extended or adjusted under 35 U.S.C. 154(b) by 567 days.

(21) Appl. No.: 18/564,889

(22) PCT Filed: Jul. 19, 2021

(86) PCT No.: PCT/IN2021/050696
§ 371 (c)(1),
(2) Date: Nov. 28, 2023

(87) PCT Pub. No.: WO2022/254450
PCT Pub. Date: Dec. 8, 2022

(65) Prior Publication Data
US 2024/0291062 A1 Aug. 29, 2024

(30) Foreign Application Priority Data
Jun. 1, 2021 (IN) ............................. 202121024470

(51) Int. Cl.
*H01M 10/653* (2014.01)
*H01M 10/613* (2014.01)
*H01M 10/651* (2014.01)

(52) U.S. Cl.
CPC ....... *H01M 10/653* (2015.04); *H01M 10/613* (2015.04); *H01M 10/651* (2015.04)

(58) Field of Classification Search
CPC ............ H01M 10/653; H01M 10/613; H01M 10/651; H01M 10/6551; H01M 50/244; C09K 5/14; Y02E 60/10
See application file for complete search history.

(56) References Cited

U.S. PATENT DOCUMENTS 7,560,190 B2 7/2009 Ahn et al.
8,934,235 B2 1/2015 Rubenstein et al.
(Continued)

FOREIGN PATENT DOCUMENTS

CN 102040390 B 12/2012
CN 106701034 A 5/2017
(Continued)

OTHER PUBLICATIONS

International Search Report dated Mar. 7, 2022 issued in PCT/IN2021 /050696.
(Continued)

*Primary Examiner* — Andrew J. Oyer

(57) ABSTRACT

A powder mixture (16) for heat dissipation and a process for forming the powder mixture (16) are disclosed. The powder mixture (16) includes $C_{15}H_{24}$, a carbonate, an oxide, an oxalate, and two or more materials selected from the group consisting of a chloride and one or more transition metal source. A component having the powder mixture (16) and a process for forming the component are also disclosed. The process for forming the component includes arranging a plurality of cells (12) of the component in an arrangement and filling a powder mixture (16) in interstitial gaps between the cells. The disclosed powder mixture (16) is tested to be very efficient, providing passive cooling, and allowing compact construction of the components. Simple processing of the powder mixture (16) enables an easy implementation of the battery modules in various systems.

10 Claims, 6 Drawing Sheets

(56) References Cited

U.S. PATENT DOCUMENTS

| | | | |
|---|---|---|---|
| 9,312,580 | B2 | 4/2016 | Nguyen et al. |
| 9,774,065 | B2 | 9/2017 | Deng et al. |
| 10,686,231 | B2 | 6/2020 | Kim et al. |
| 2019/0207188 | A1 | 7/2019 | Miller et al. |

FOREIGN PATENT DOCUMENTS

| | | | |
|---|---|---|---|
| CN | 111320453 | A | 6/2020 |
| TW | M592605 | U | 3/2020 |
| WO | 2020197982 | A1 | 10/2020 |
| WO | 2021009116 | A1 | 1/2021 |

OTHER PUBLICATIONS

Written Opinion dated Mar. 7, 2022 issued in PCT/I N2021 /050696.

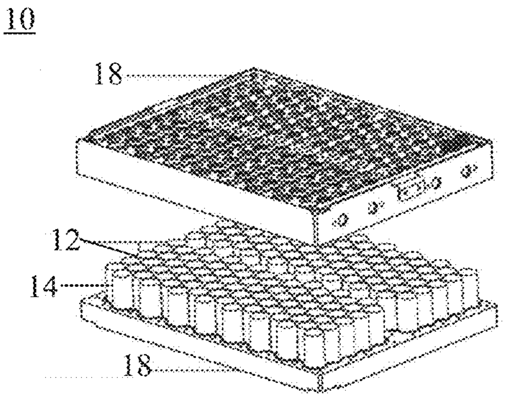
FIG. 1A
FIG. 1B
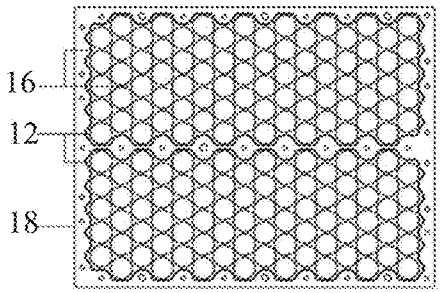
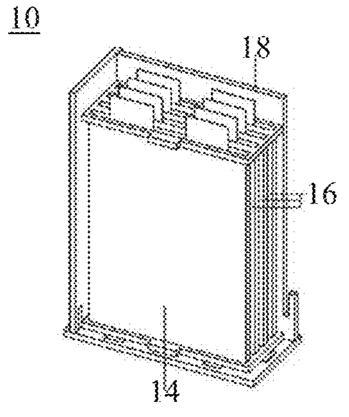
FIG. 1C
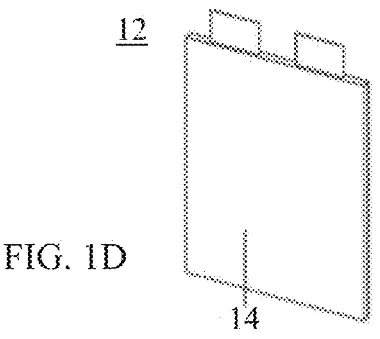
FIG. 1D

POWDER MIXTURE FOR HEAT DISSIPATION AND COMPONENTS HAVING THE POWDER MIXTURE

FIELD OF TECHNOLOGY

The present disclosure generally relates to a powder mixture for heat dissipation and components having the powder mixture. More particularly, the disclosure relates to a specifically designed powder mixture having both organic and inorganic constituents and a component having the powder mixture for heat dissipation.

BACKGROUND

Dissipation of generated heat is a requirement in electronic or electrochemical devices. Air cooling and liquid cooling of automotive battery modules has been extensively explored till date. The main aim of cooling is to maintain the temperature of the battery modules to pre-defined operational ranges. Accumulation of heat in components such as a battery module normally leads to cell failure causing thermal runaway of the module. In air and liquid cooling, considerable energy is required for refrigerant flow which includes fans, manifolds etc.

Another important aspect is battery pack size. A more sophisticated cooling system generally increases the size of the component. U.S. Pat. No. 7,560,190B2 discloses a cooling system for batteries that can use both air and liquid interchangeably as refrigerants for cooling. The overall idea of the said patent was to make the battery system coupled with a cooling circuit more flexible and compact. However, using air as a refrigerant causes the cooling process to be inefficient. The use of liquid cooling was comparatively better but made use of auxiliaries like pumps and fans thus not making the system as compact as aimed.

Many battery packs are liquid cooled which have a liquid like oil or glycol passing through the module to take out heat using convection. However, the cooling circuit is prone to leaks as mentioned in the patent U.S. Pat. No. 9,774,065B2. At the same time since the liquid needs to be cooled and recirculated, peripherals like pumps and radiators are used which take a lot of space and electrical power making it less efficient as explained in U.S. Pat. No. 10,686,231B2. In some cases, a liquid refrigerant is also used to facilitate heat transfer as presented in U.S. Pat. No. 10,686,231B which presents challenges in manufacturing as tight tolerances are required for sealing and it is not a cost effective setup.

One other method is to use phase change materials (PCM) as a heat transfer element which can rapidly remove heat corresponding to their latent heat of phase change as explained in patent U.S. Pat. No. 9,312,580B2. The PCM melts to absorb heat and moves through pathways to increase the surface area resulting in better heat removal. Such technology could utilize forced convection using fans as presented in U.S. Pat. No. 8,934,235B2, which also takes up extra space, produces noise, and consumes electrical power. PCM materials also impart stress in all directions during expansion.

CN202010094027A provides an isolation material for inhibiting thermal runaway diffusion of a battery. The material includes silicate aggregate filled with heat conduction materials, water glass, water repellent, curing agent, an active filler, silica sol, styrene-acrylic emulsion surfactant, water glass reinforcing agent, reinforcing fiber and of flame retardant. CN102040390B discloses a SiO2 nano/micron powder composite low-dimension thermal insulation material and one-dimensional aluminum silicate fibers distributed evenly and forms a low-dimension thermal insulation material having resistance to high temperature, low thermal conductivity, and low cost. However, a need for a solid thermal dissipative material persists.

SUMMARY

This summary is provided to introduce concepts of the subject matter in a simple manner that is further described in the detailed description of the disclosure. This summary is not intended to identify key or essential inventive concepts of the subject matter nor is it intended to determine the scope of the disclosure.

In order to solve at least one of the problems mentioned above, the present disclosure discloses a powder mixture that is capable of providing effective cooling for heat producing parts of any components, thereby preventing thermal runaway, explosion and overload.

Briefly, according to an aspect, a powder mixture for heat dissipation is disclosed. The powder mixture includes $C_{15}H_{24}$, a carbonate, an oxide, an oxalate, and two or more materials selected from the group consisting of a chloride and one or more transition metal source. A component having the powder mixture is also disclosed.

In another aspect a process for preparation of a powder mixture for heat dissipation is disclosed. The process includes dry milling or dry mixing $C_{15}H_{24}$, a carbonate, an oxide, an oxalate, and two or more materials selected from the group consisting of a chloride and one or more transition metal source.

In yet another aspect, a process for forming a component having a plurality of cells is disclosed. The process includes the steps of arranging the plurality of cells in an arrangement and filling a powder mixture in interstitial gaps between the cells. The powder mixture is configured to dissipate heat. The powder mixture includes $C_{15}H_{24}$, a carbonate, an oxide, an oxalate, and two or more materials selected from the group consisting of a chloride and one or more transition metal element source.

The above summary is illustrative only and is not intended to be in any way limiting. In addition to the illustrative aspects, example embodiments, and features described above, further aspects, example embodiments, and features will become apparent by reference to the drawings and the following detailed description.

BRIEF DESCRIPTION OF THE FIGURES

These and other features, aspects, and advantages of the exemplary embodiments can be better understood when the following detailed description is read with reference to the accompanying drawings in which like characters represent like parts throughout the drawings, wherein:

FIG. 1A illustrates a schematic view of battery module having a cylindrical cell arrangement and powder filling, in accordance with one embodiment of the present disclosure;

FIG. 1B illustrates a top view of the cell and powder mixture arrangement in the battery module shown in FIG. 1A, in accordance with one embodiment of the present disclosure;

FIG. 1C illustrates a schematic view of battery module having a pouch cell arrangement and powder filling, in accordance with one embodiment of the present disclosure;

FIG. 1D illustrates a perspective view of a single cell in the battery module shown in FIG. 1C, in accordance with one embodiment of the present disclosure;

Figure 2:
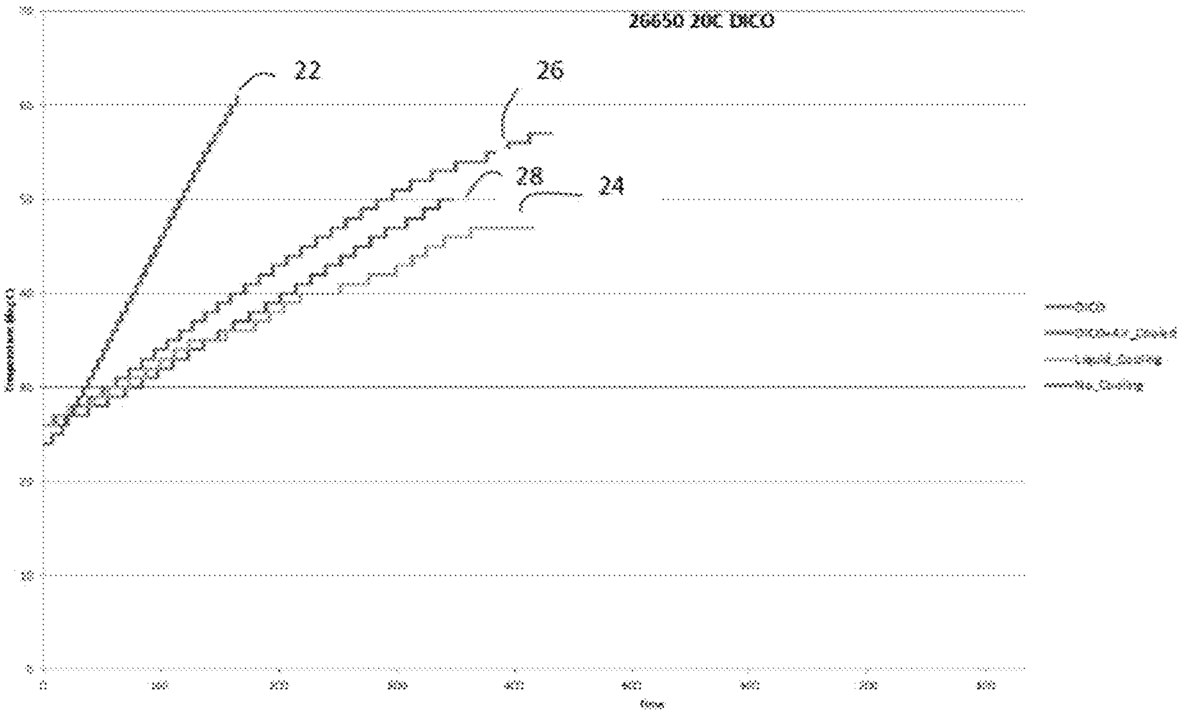
FIG. 2 illustrates a comparative graph of thermal performance of battery modules without any heat dissipation arrangement, with the powder mixture heat dissipation, with the powder mixture and air-cooling arrangement, and with a liquid cooling arrangement, when measured using a specific type of cell with an allowed peak discharge of 20 C, in accordance with one embodiment of the present disclosure.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion such that a process or method that comprises a list of steps does not comprise only those steps but may comprise other steps not expressly listed or inherent to such a process or a method. Similarly, one or more devices or subsystems or elements or structures or components proceeded by "comprises . . . a" does not, without more constraints, preclude the existence of other devices or other subsystems or other elements or other structures or other components or additional devices or additional subsystems or additional elements or additional structures or additional components. Appearances of the phrase "in an embodiment", "in another embodiment" and similar language throughout this specification may, but do not necessarily, all refer to the same embodiment.

The term DICO® as used hereinafter refers to the powder mixture of the present invention which includes various inorganic components and at least one organic component i.e. $C_{15}H_{24}$.

Unless otherwise defined, all technical and scientific terms used herein have the same meaning as commonly understood by one of ordinary skill in the art to which this invention belongs. The system, methods, and examples provided herein are illustrative only and not intended to be limiting.

In addition to the illustrative aspects, exemplary embodiments, and features described above, further aspects, exemplary embodiments of the present disclosure will become apparent by reference to the drawings and the following detailed description.

The present disclosure relates to a powder mixture that can be used as an effective heat dissipating material when used in any heat producing device, including electronic and electrochemical devices. Specifically, the disclosed powder mixture is effective as a heat dissipating material in a modular battery system for electric vehicles, for cooling, and preventing thermal runaway, explosion and thermal overload.

Convection and conduction are considered as the dominant modes of heat transfer at and near room temperature. Heat transfer via conduction is due to electron transfer and molecular lattice vibrations. The cells of a battery module dissipate large amounts of heat to the powder during high load and high-speed cycles. The disclosed powder has high absorbing capability to absorb the dissipated heat in order to maintain optimum temperature range of the cells. The disclosed powder stores the heat within its constituents and releases to an external heat sink.

In the present disclosure, a synergistic powder mixture is disclosed that has both organic and inorganic compounds as its constituents. The constituents include, but are not limited to, family of inorganic oxalates, chlorides, oxides, and carbonates. The powder mixture may be obtained by dry mixing and heating to drive away any moisture content and used as a medium of heat transfer. The disclosed powder mixture is compatible for both static applications and dynamic applications including server grids and automotive cooling.

Specifically, the present disclosure discloses a powder mixture for heat dissipation. The powder mixture includes various constituents. An organic material, $C_{15}H_{24}$ is included in the powder mixture. $C_{15}H_{24}$ belongs to a sesquiterpenoid family and is generally known by the name isocaryophyllene, while other nomenclature may also be used. $C_{15}H_{24}$ is a pale-yellow oily liquid having a flash point slightly above 100° C. Generally, $C_{15}H_{24}$ is used in food and pharmaceutical industries considering its odor and anti-inflammatory properties.

$C_{15}H_{24}$ used herein is particularly advantageous for its low cloud point, high boiling and flash point, insolubility in water, aromatic properties, and can be naturally sourced from essential oil producing plants. When mixed with any powdered inorganic compounds, it tends to increase heat transfer rate of the resulting mixture, allowing rapid heat dissipation.

The inorganic components of the powder mixture include at least one carbonate, at least one oxide, and at least one oxalate. The inorganic component also includes two or more materials selected from the group consisting of a chloride and one or more transition metal element source.

In some embodiments, the powder mixture includes calcium carbonate, silicon dioxide, neodymium praseodymium oxalate, and two or more materials selected from the group consisting of ammonium chloride, zirconium dioxide, zirconium sulphate, zirconium carbide, zirconium metal, iron oxide, and carbonyl iron. It can be noted that while calcium carbonate, silicon dioxide, and neodymium praseodymium oxalate are specifically noted here, other carbonates, oxides, and oxalates may also be used in conjunction with these materials. Further, along with the two or more selected materials, other similar or dissimilar materials may also be included for imparting application specific properties to the powder mixture.

In some embodiments, the two or more selected materials include ammonium chloride along with one or more of zirconium dioxide, zirconium sulphate, zirconium carbide, zirconium metal, iron oxide, and carbonyl iron. In certain embodiments, the two or more selected materials include two or more transition metal sources. In certain embodiments, the selected materials include ammonium chloride along with two or more transition metal sources. In various embodiments, the transition metal source may include two sources of zirconium, two sources of iron, or at least one source of zirconium and at least one source of iron. In some embodiments, elemental form of zirconium and carbonyl iron may be used.

The constituents of the powder mixture may have various weight ratios in the mixture. Generally, the constituents are mixed such that the $C_{15}H_{24}$ is in a range from 0.1 wt. % to 30 wt. %; calcium carbonate is in a range from 20 wt. % to 60 wt. %; silicon dioxide is in a range from 5 wt. % to 45 wt. %; neodymium praseodymium oxalate is in a range from 5 wt. % to 25 wt. %; and the two more materials combinedly in a range from 10 wt. % to 65 wt. % of the powder mixture.

In some embodiments, the amount of two or more materials of the powder mixture may be such that the ammonium chloride is present in a range from 0.1 wt. % to 30 wt. %; and one or more transition metal sources are in a range from 10 wt. % to 55 wt. % of the powder mixture. While weight ratios of the transition metal sources may vary depending on the compounds used as the transition metal source, the above-mentioned range may be approximately considered as selected based on the amount of metal present in the compounds used. Thus, in some embodiments, the amount of the transition metal present in the one or more transition metal sources may be considered to be present in a range from 10 wt. % to 55 wt. % of the powder mixture. Depending on the applications, the powder weight ratios may be varied within the above specified weight ranges.

To evaluate thermal properties of the disclosed powder mixture, conductivity test using transient plane heat source (hot disc) method was performed on the powder mixture. This method uses a hot-disc probe of negligible heat capacity to give out stepwise heat pulses to generate a dynamic temperature field within the specimen. The probe also acts as a temperature sensor unified with a heat source i.e. a self-heated sensor. Test parameters such as power output to the probe, radius of probe, scanning rate, and measurement time are subjective to the material composition. A response in the form of change in resistance is then analysed with a model developed for the specific specimen, probe, and boundary conditions. A constant temperature environment (45° C.) was maintained during the test. 45° C. was chosen because the optimum temperature for the cell is 45° C. The thermal conductivity of the disclosed powder mixture at 45° C. was found to be 0.284 W/mK and the specific heat capacity was found to be 1.096 $MJ/m^3K$.

The present disclosure also discloses a component having the disclosed powder mixture. The disclosed powder mixture may be used for thermal management in any components having heat dissipation needs. Specifically, the powder mixture is particularly suitable in a component that has both heat dissipation needs and a space constraint. The powder mixture may be used in electronic components such as microcontrollers, data servers, power electronics components, inside motherboard casings of computational devices such as mobile phones, laptops, HTPC, etc. The powder mixture can also be used in some electrochemical systems such as in battery packs, battery modules, fuel cells, electrolysers etc. For example, the disclosed powder mixture may be used in low powered range battery packs used in locomotive applications such as bikes, scooters, hoverboards, golf cart, etc., and in backup power applications such as inverter battery packs, portable power supply modules for cell phones and laptops. Various embodiments of the present disclosure are hence forward described with an example of a battery module. Nevertheless, it should be noted that the disclosed powder mixture can be used for heat absorbing and channeled heat dissipation to external heat sink in any of the above-mentioned and any other components. Further, depending on the environment and applications of the component and their working conditions, the constituents and weight ratios of the powder mixture may be varied as disclosed above.

In some embodiments, the component disclosed herein is a battery module. The battery module may be used individually or in combination with other modules in any application, including but not limited to an automotive application. The battery module includes a plurality of cells. The cells of the battery module may have different size, structure and designs. For example, FIG. 1A shows a battery module (10) having cells (12) in cylindrical shape and FIG. 1C shows another battery module (10) having cells (12) in pouch shape. FIG. 1B shows a top-down view of the cell arrangement in the battery module (10) of FIG. 1A, and FIG. 1D shows a single cell (12) of the battery module shown in FIG. 1C. The cells (12) have a cell wall surface (14) and in the battery modules (10) of the present disclosure, the cell walls (14) are surrounded by the powder mixture (16). The powder mixture (16) surrounding the cell wall surface (14) provides surface cooling to each of the cells (12). The inherent heat absorbing and dissipation properties of the powder mixture (16) aids the heat absorption from the cells (12) along with the cell wall surfaces (14). The battery module (10) may further include casings (18) that cover the plurality of cells.

A thermal management capacity of the powder is evaluated by the heat dissipation that can be obtained by the powder in the system in which the powder is employed for thermal management. In the present example, the powder mixture (16) is placed around the cells touching the cell walls. The heat produced by the cells may vary based on the applications and operating conditions. Therefore, a metric is devised to understand the thermal management system, to compare performances, and to aid the design process of the battery module. A metric of Mass of powder per cell area (MPCA) measured in the unit of $kg/m^2$ is used to evaluate the thermal management capacity of the powder mixture (16). The metric is closely associated with the surface area of the cell in contact with the powder mixture as the heat transfer from the cell (12) through the cell walls depends on the surface area of the cells (12). Thus, MPCA of a battery module (10) may be determined as $$MPCA = \frac{\text{Mass of powder in the pack (kg)}}{\text{surface area of cells in contact with the powder } (m\hat{}2)}$$

Here it can be observed that powder mixture (16) would be considered to have a better performance in a given component (10), if the MPCA value is higher. In some embodiments, an MPCA value of the battery module is in a range from 1 $kg/m^2$ to 12 $kg/m^2$. In an example battery module of the present disclosure, depending on the constituents of the powder mixture (16), the MPCA value obtained is about 3.52 $kg/m^2$. In another example, the MPCA value is 6.589 $kg/m^2$. In yet another example, the MPCA value obtained is 2.592 $kg/m^2$. These MPCA values are seen to be providing satisfactory performance to the respective battery modules. In some embodiments, a range between 1 $kg/m^2$ and 12 $kg/m^2$ is desirable. Beyond 12 $kg/m^2$, the performance may become asymptotic, without much value addition in adding more weight.

The use of powder mixture for cooling purpose aims to absorb the heat from the surface of the cells and not let the cell temperature rise. A casing of the battery module can have interstitial gaps between cells that can act as pockets which are filled with powder along the surface of the cells leading to uniform heat distribution throughout the pack. Powder with its high heat absorptivity keeps the cell temperature optimum. Pockets of powder mixture also help in times of a thermal runaway, in case, if any cell experiences over temperature, and acts as a fire suppressant thereby keeping the other cells safe. Powder mixture for surface cooling may also be used along with any other heat dissipation system for axial cooling. Further, a method of air cooling via natural or forced convection may also be used in conjunction with the powder mixture disclosed herein. In some embodiments of the present disclosure, both conduction and convection methods of cooling are used in order to keep the battery cell temperatures within operating range.

Pulse discharge tests on different battery modules having various cooling arrangements were performed to assess the thermal management performance of the disclosed powder mixture as heat dissipation medium in a battery module. The pulse discharge tests were performed using test cycle simulations of driving conditions of an automobile where various battery modules are used. The above-mentioned battery modules are used in similar driving conditions. The test conditions simulated here are for extreme conditions where a driver driving the automobile would be slamming the accelerator for 4.5 seconds followed by leaving the accelerator for 3.5 seconds and repeating the acceleration and leaving for about 50 times. Thus, it can be considered that the test performed here has a 55% duty cycle with a $T_{(on)}$ time of 4.5 seconds and $T_{(off)}$ time of 3.5 seconds.

The test cycle used herein is one of the most stringent tests performed on the cell, which discharges the complete cell from 100% state of charge (SoC) to 10% SoC in about 6 minutes. The Ambient temperature during the test was maintained at 25° C. In the test, for good thermal management, the cell should not reach temperature above 60° C. as that can reduce the life of the cells and may lead to thermal runaway, if not cooled properly.

FIG. 2 illustrates a comparative graph of thermal performance of four different battery modules. The cells used in the battery modules for this comparison are 26650 LiFePo4 type cylindrical cells which are power dense, and the peak discharge allowed for the cell is 20 C.

In the compared battery modules, one battery module does not have any associated heat dissipation/cooling mechanism. Curve (22) in FIG. 2 represents the thermal performance of the battery module that does not have any heat dissipation mechanism. Another battery module has a liquid cooling mechanism, the thermal performance of which is represented by curve (24). Yet another battery module has the cooling mechanism using the powder mixture of the present disclosure, the thermal performance of which is represented by curve (26). One more battery module has a heat dissipation mechanism using the powder mixture of the present disclosure along with air cooling, as represented by the curve (28). The results clearly show that even in this very extreme high-power condition, the cell temperature in the battery module that has only the powder mixture as the heat dissipating medium and the battery module that has the powder mixture as the heat dissipating medium along with air cooling do not surpass the operating limit of 60° C.

Figure 3:
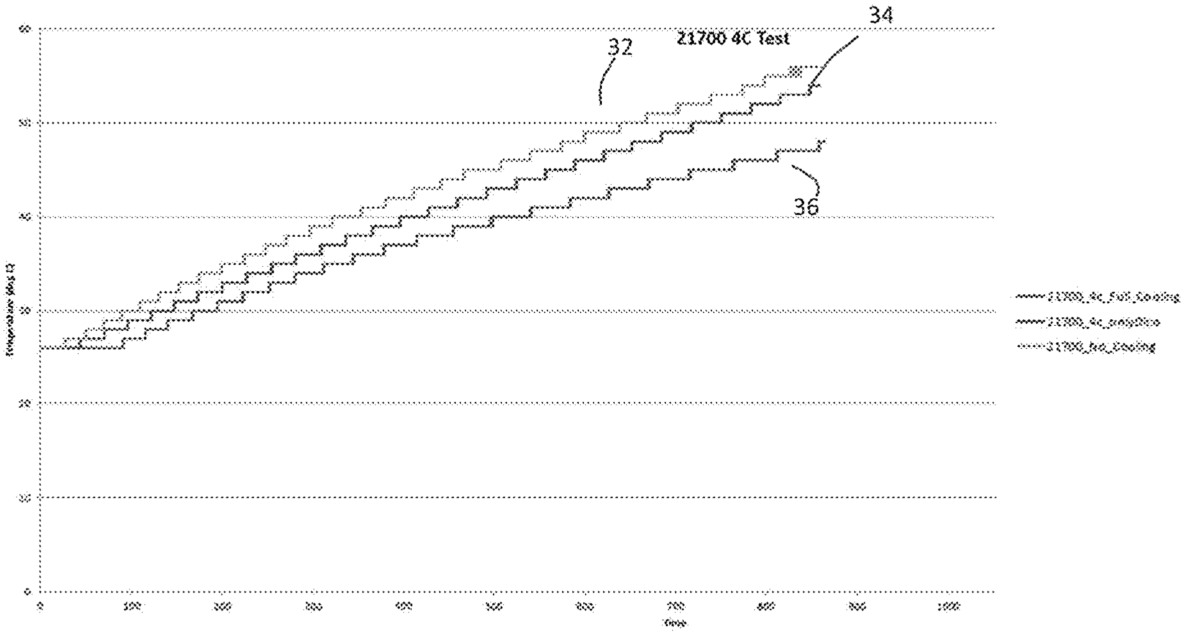
FIG. 3 illustrates a comparative graph of thermal performance of battery modules without any heat dissipation arrangement, with the powder mixture heat dissipation, and with the powder mixture and air-cooling arrangement, when measured using a specific type of cell with an allowed peak discharge of 4 C, in accordance with one embodiment of the present disclosure.

FIG. 3 illustrates a comparative graph of thermal performance of three different battery modules. The cells used in the battery modules for this comparison are 21700 Li-Ion type cylindrical cells, which are power dense and that is different from that shown in FIG. 2, and the peak discharge allowed for the current cell is 4 C.

One battery module out of the three battery modules does not have any associated heat dissipation/cooling mechanism. Curve (32) represents the thermal performance of this battery module without any powder. Another battery module has the cooling mechanism using the powder mixture of the present disclosure, represented by curve (34). Yet another battery module has a heat dissipation mechanism using the powder mixture of the present disclosure along with air cooling, as represented by the curve (36). The curves in the graph appear stepped because the least count of SoC is 1 from 100 to 0, which means that only one temperature data per SoC value can be shown.

The curves in the graph are drawn for test cycle simulations of driving conditions of an automobile where the above-mentioned battery modules are used in similar driving conditions. The test conditions simulated here are similar to that disclosed above. The test cycle used herein discharges the complete cell from 100% SoC to 10% SoC in about 13 minutes. The Ambient temperature during the test was maintained at 25° C. In the test, for good thermal management, the cells should not reach temperature above 60° C. as that can reduce the life of the cells and may lead to thermal runaway, if not cooled properly.

The results as shown in the graph at FIG. 3 clearly showcase that the battery module without any kind of cooling does not even reach the full cycle and reaches a temperature of more than 55° C. However, even in this very extreme high-power condition, the cell temperature in the battery module with the powder mixture of the present disclosure is retained at an optimum temperature of around 50° C., and the thermal management of the battery module increases by additional air cooling along with the heat dissipation using the powder mixture.

Since the powder mixture (16) is laid evenly around each cell in the battery module (10), it facilitates a minimal temperature gradient throughout the series and parallel connections of cells (12) in the battery module (10). The powder mixture (16), by the virtue of conduction and its high heat absorption capability, prevents any dramatical heat increase during heavy discharge of the cells (12) of the battery module (10). The battery module (10) may also include various design features to avoid any leakage of the powder mixture (16).

Figure 4:
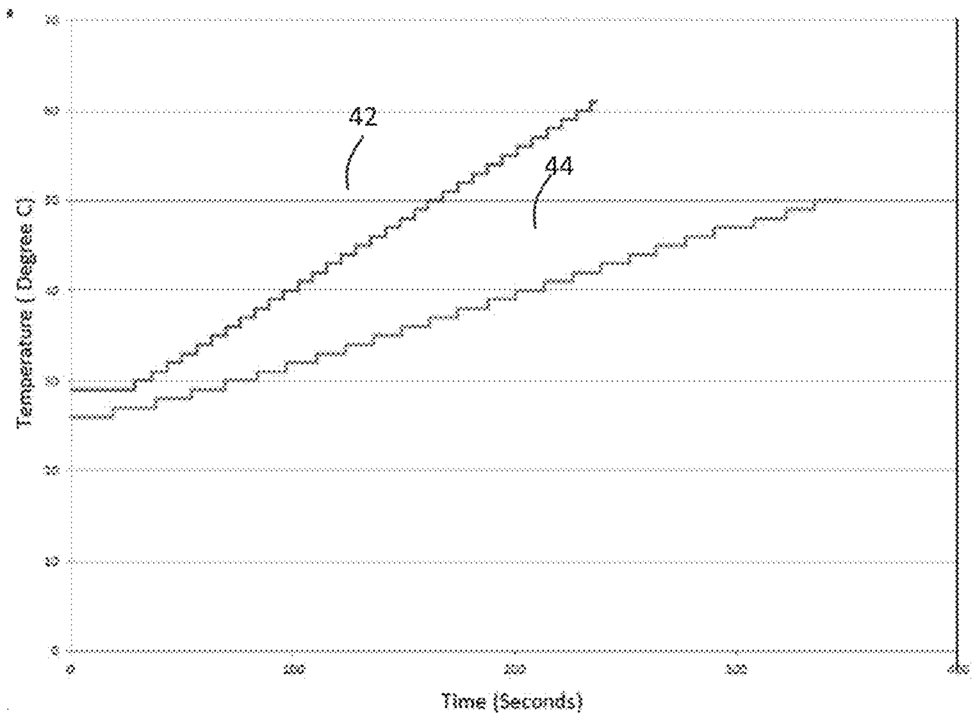
FIG. 4 illustrates a graph comparing thermal management performance of two types of powders, when measured using a specific type of cell with an allowed peak discharge of 20 C, in accordance with one embodiment of the present disclosure.

FIG. 4 illustrates a comparative graph of thermal performance of two different battery modules having different powders. The curves in the graph are drawn for test cycle simulations of driving conditions of an automobile. The test conditions simulated here are similar to that disclosed above. This test cycle discharges the complete cell from 100% SoC to 10% SoC in about 6 minutes. In the test, for good thermal management, the cell should not shoot to temperature above 60° C. as that can reduce the life of the cells and may lead to thermal runaway, if not cooled properly.

A powder dense cell is used for testing the performance of two different powder mixtures. The peak discharge allowed for this cell is 20 C. The two different powder mixtures have different powder constituents and proportions. The cell was run by individually using a baseline powder mixture and a powder mixture according to the present disclosure. The baseline mixture has the composition of calcium carbonate in a range from 40 wt. % to 60 wt. %. silicon dioxide in a range from 10 wt. % to 40 wt. %, and ammonium chloride in a range from 0.1 wt. % to 10 wt. %. The composition of the powder mixture disclosed in the present disclosure includes calcium carbonate in a range from 20 wt. % to 60 wt. %, silicon dioxide in a range from 5 wt. % to 45 wt. %, ammonium chloride in a range from 0.1 wt. % to 30 wt. %, $C_{15}H_{24}$ in a range from 0.1 wt. % to 30 wt. %, carbonyl iron powder in a range from 10 wt. % to 30 wt. %, neodymium praseodymium oxalate in a range from 5 wt. % to 25 wt. %, and zirconium metal powder in a range from 10 wt. % to 35 wt. %.

The graph at FIG. 4 illustrates the comparative test results between the cell having the baseline powder and the cell having the powder mixture of the present disclosure, when the cell was operated under the same test conditions. Specifically, in FIG. 4, curve (42) illustrates the thermal performance of the cell when the baseline is used and curve (44) represents the thermal performance of the cell when the powder composition as disclosed in the present disclosure is used.

From the graph, it can be clearly seen that the powder mixture of the present disclosure containing various disclosed constituents at certain range performs substantially better than the baseline powder that contains only three constituents. Specifically, it can be seen from the graph that the baseline powder could not aid the cell to complete the test, and it reaches 60° C. after reaching 37% SoC, thereby not using the full capacity of the cell. However, the powder mixture of the present disclosure completes the full test and does not let the cell reach beyond 52° C., thereby keeping the cell in the optimum range. Thus, after rigorous testing of the powder samples, it can be seen that the disclosed powder mixture has higher performance.

Figure 5A:
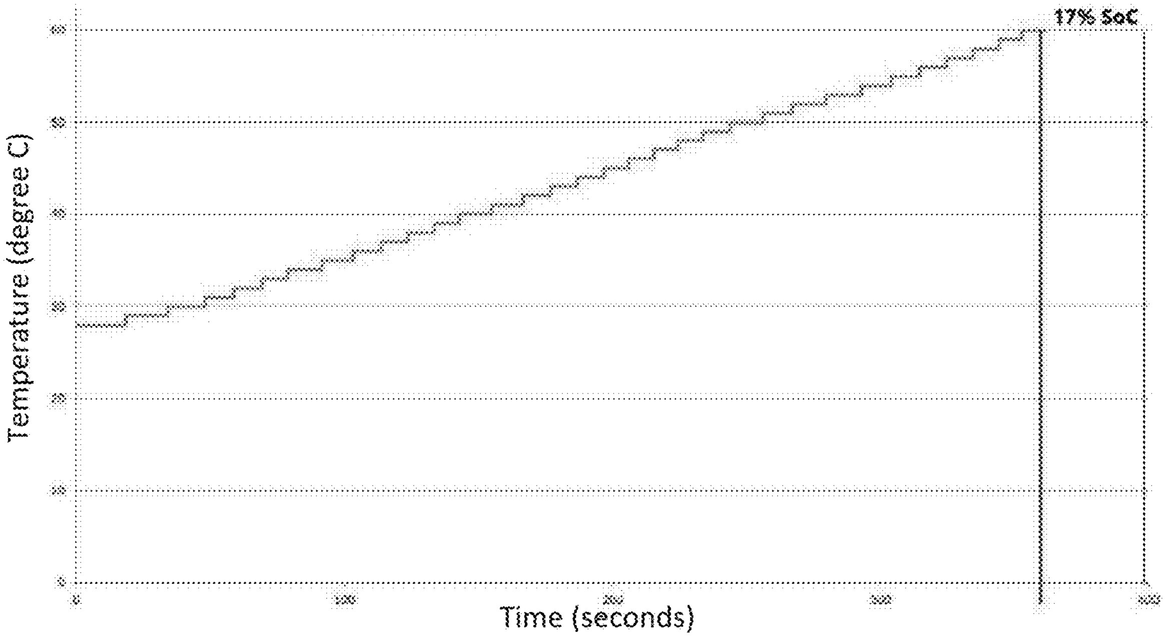
FIG. 5A illustrates a graph showing thermal management performance of a battery module having a powder mixture having certain constituents with a certain percentage ratio of the constituents, in accordance with one embodiment of the present disclosure.
Figure 5B:
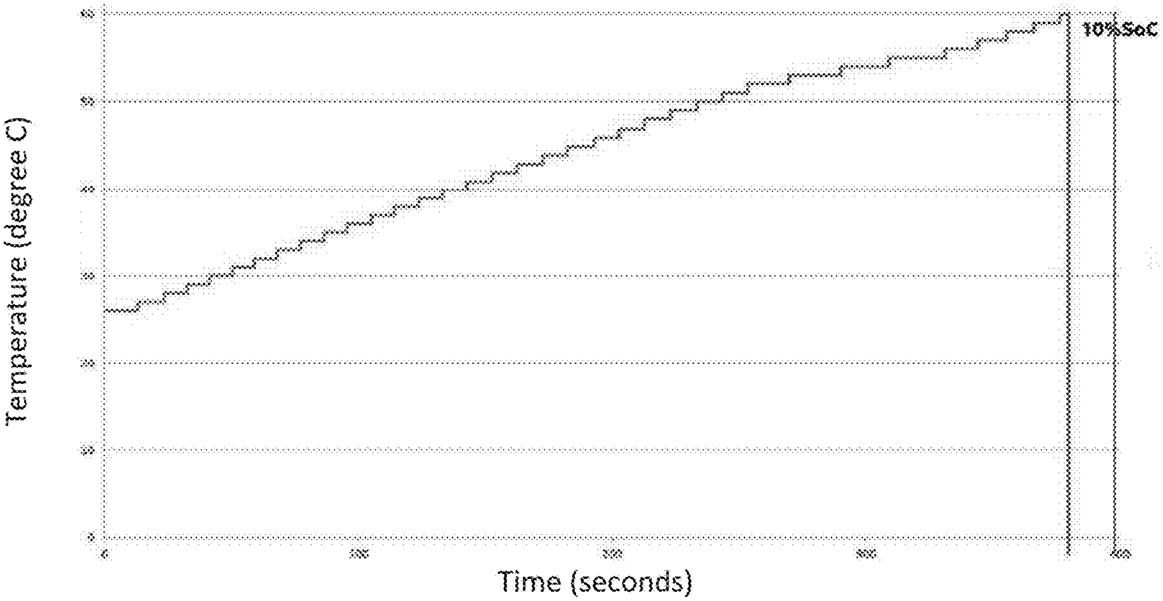
FIG. 5B illustrates a graph showing thermal management performance of a battery module having a powder mixture having the same constituents as in the battery module having the thermal management graph shown in FIG. 5A, but with a different percentage ratio of the constituents in accordance with one embodiment of the present disclosure.

FIGS. 5A and 5B illustrate graphs of thermal performance of battery modules having the powder mixture having the same constituents, but with varying percentage ratios of the constituents. The test conditions simulated here are similar to that disclosed above. This test cycle discharges the complete cell from 100% SoC to 10% SoC in about 6 minutes. In the test, for good thermal management, the cell should not shoot to temperature above 60° C. as that can reduce the life of the cells and may lead to thermal runaway, if not cooled properly. A powder dense cell is used for testing the performance of two different powder mixtures. The peak discharge allowed for this cell is 20 C.

The two different powder mixtures have the same powder constituents and varied proportions of the constituents. The powder mixture used in the first battery module has the composition that has 25 wt. % of calcium carbonate, 50 wt. % of silicon dioxide, 1 wt. % of ammonium chloride, 1 wt. % of $C_{15}H_{24}$, 2 wt. % of carbonyl iron powder, 3 wt. % of neodymium praseodymium oxalate, and 18 wt. % of zirconium metal powder. FIG. 5A illustrates the thermal management graph of the battery module having this composition.

The powder mixture used in the second battery module has the composition that has 50 wt. % of calcium carbonate, 10 wt. % of silicon dioxide, 1 wt. % of ammonium chloride, 20 wt. % of $C_{15}H_{24}$, 2 wt. % of carbonyl iron powder, 5 wt. % of neodymium prascodymium oxalate, and 12 wt. % of zirconium metal powder. FIG. 5B illustrates the thermal management graph of the battery module having this composition.

Comparing the graphs at FIG. 5A and FIG. 5B, it can be clearly seen that the powder mixtures having the same constituents and varying percentage ratios of the constituents have different thermal performance. Specifically, the graph at FIG. 5A did not finish the full test and the test is stopped at 17% SoC since it reached 60° C. On the contrary, the graph at 5B finishes the test at 10% SoC although it hits 60° C. Therefore, selecting a proper ratio of the various constituents in the powder mixture is desirable.

In some embodiments, the $C_{15}H_{24}$ is present in a range from 0.1 wt. % to 14 wt. %; calcium carbonate is present in a range from 30 wt. % to 55 wt. %; silicon dioxide is present in a range from 10 wt. % to 40 wt. %; neodymium praseodymium oxalate is present in a range from 4 wt. % to 12 wt. %; and the two more materials combinedly are present in a range from 20 wt. % to 55 wt. % of the powder mixture. In some embodiments having ammonium chloride and both the transition metal sources, a weight ratios of ammonium chloride and the transition metal sources, used in a specific application may be selected such that ammonium chloride is present in a range from 0.1 wt. % to 11 wt. %, an elemental iron content in the iron source is present in a range from 1 wt. % to 10 wt. %, a zirconium metal content in the zirconium source is present in a range from 20 wt. % to 35 wt. % of the powder mixture.

Figure 6:
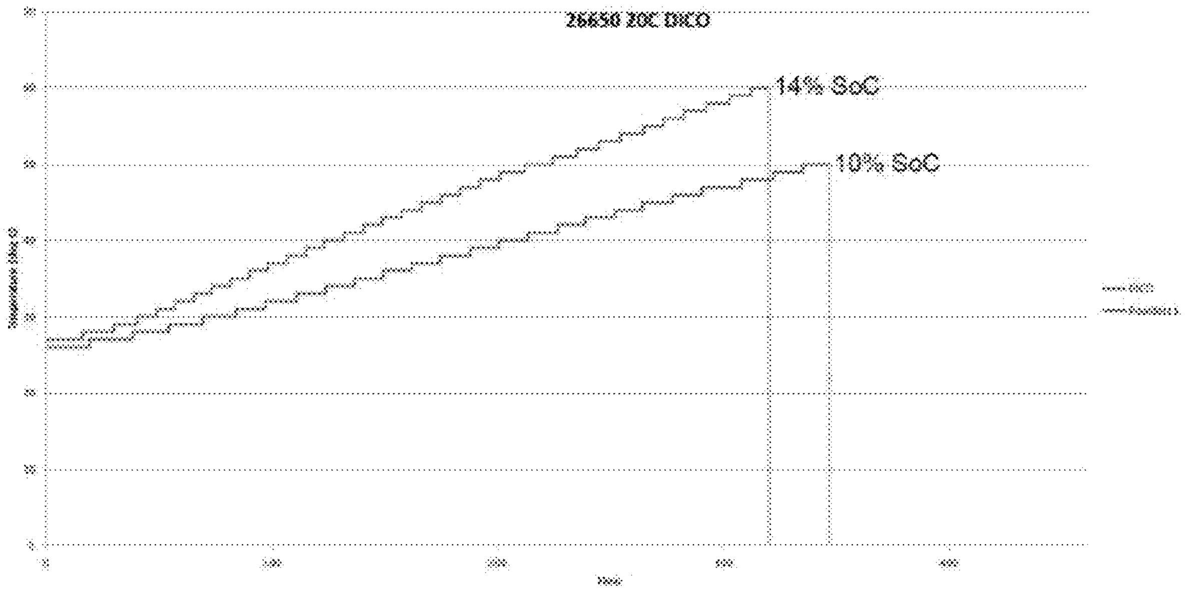
FIG. 6 illustrates a graph of thermal performance and comparative study of two battery modules tested under the same test setup and conditions with only one differentiating factor i.e., one battery module with a powder mixture having $C_{15}H_{24}$ and one battery module without $C_{15}H_{24}$.

FIG. 6 illustrates a graph of thermal performance of battery modules i.e., one battery module with a powder mixture having $C_{15}H_{24}$ and one battery module without $C_{15}H_{24}$. Both these battery modules are tested with the same test setup and conditions. Further, the volume of powder per cell remains the same in both the battery modules as tested. The goal of the experiment is to drain the battery pack from 100% to 10% within 6 minutes. The test involved a stringent high discharge of 20 C on 26650 cells.

In an experimental setup, and as shown in graph of FIG. 6 the DICO® (60) represents the powder mixture which includes all the 7 constituents including $C_{15}H_{24}$ and Powder11 (61) is without $C_{15}H_{24}$. Further, the test cycle includes simulation of an extreme driving condition as if the driver is slamming the accelerator for 4.5 sec and then leaving it for 3.5 sec, and repeating this for about 50 times. The test has a 55% duty cycle with a $T_{(on)}$ time of 4.5 sec and $T_{(off)}$ time of 3.5 secs. The said test cycle as performed hereinabove is the most stringent test performed on the battery cell which discharges the complete battery cell from 100% SoC to 10% SoC in 6 minutes. The ambient temperature during the test is maintained at 25° C.

The said graph of FIG. 6 and the experimental outcome indicate that the battery module with DICO® (60) having all the 7 constituents including $C_{15}H_{24}$ results good performance and reached temperature of 50° C. However, the battery module with Powder11 (61) which is without $C_{15}H_{24}$ failed the said test since it reached the temperature threshold of 60° C. at 14% SoC.

Hence, it is concluded that $C_{15}H_{24}$ plays a vital role in heat dissipation and is an important part of the powder mixture (16) of the present invention to achieve the best results.

In one embodiment, a process for preparation of the powder mixture (12) is provided. The process includes dry milling or dry mixing the constituents of the powder mixture. In some embodiments, the constituents may be heated before mixing/milling or after the mixing/milling step. Heating the constituents may eliminate moisture from the powder mixture. In some embodiments, the heating is limited to 100° C.

In another embodiment, a process for forming a component having a plurality of cells, such as for example, a battery module (10) is disclosed. The process includes arranging the plurality of cells (12) in an arrangement and filling the powder mixture (16) in interstitial gaps between the cells. Majority or all cell walls are covered with powder mixture (16) that helps in surface cooling and keeps the temperature low during high discharge cycles.

Thus, the embodiments of the present invention provide a novel powder mixture that can be utilized for heat absorption purposes. The powder mixture may be used in any components to surround the heat dissipating parts so as to absorb the heat from the parts and dissipate it to an external heat sink. The disclosed powder mixture is tested to be very efficient and has low values of MPCA, thus allowing for compact construction of the components. The disclosed powder mixture is electrically non-conductive, hence provides high electrical insulation between the cells of the component. The cooling method used by employing the disclosed powder mixture is a passive cooling method, in which there are no moving parts or large equipment that are required for achieving cooling. Absence of moving parts makes the components fail proof. Along with preventing thermal runaway, the disclosed powder mixture also aids in extinguishing fire that may be originating in the surrounding of the powder mixture.

The powder mixture enables a modular design and great flexibility in placing the battery modules in systems such as an automobile, thus leading to more creative use of the space available in the automobile. Further, the simple processing of the powder mixture enables an easy implementation of the battery modules in various systems.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible.

We claim:

1. A powder mixture (16) for heat dissipation, the powder mixture (16) comprising: $C_{15}H_{24}$, a carbonate, an oxide, an oxalate, and two or more materials selected from the group consisting of a chloride and one or more transition metal source.

2. The powder mixture (16) as claimed in claim 1, comprising calcium carbonate, silicon dioxide, neodymium praseodymium oxalate, and two or more materials selected from the group consisting of ammonium chloride, zirconium dioxide, zirconium sulphate, zirconium carbide, zirconium metal, iron oxide, and carbonyl iron.

3. The powder mixture (16) as claimed in claim 1, wherein the $C_{15}H_{24}$ is in a range from 0.1 wt. % to 30 wt. %;

calcium carbonate is in a range from 20 wt. % to 60 wt. %;

silicon dioxide is in a range from 5 wt. % to 45 wt. %;

neodymium praseodymium oxalate is in a range from 5 wt. % to 25 wt. %; and the two or more materials combinedly in a range from 10 wt. % to 65 wt. % of the powder mixture.

4. The powder mixture (16) as claimed in claim 3, wherein the two or more materials comprise:

ammonium chloride in a range from 0.1 wt. % to 30 wt. %; and one or more transition metal source in a range from 10 wt. % to 55 wt. % of the powder mixture.

5. A component comprising the powder mixture (16) of claim 1.

6. The component as claimed in claim 5, wherein the component is selected from the group comprising a data server, a power distribution unit and a computational device.

7. The component as claimed in claim 5, wherein the component is a battery module (10) comprising the powder mixture (16) surrounding cell wall surface (14) of a plurality of cells (12) of the battery module.

8. The component as claimed in claim 7, wherein a mass of powder per cell area is in a range from 1 kg/m$^2$ to 12 kg/m$^2$.

9. A process for preparation of a powder mixture (16) for heat dissipation, wherein the process comprises:

dry milling or dry mixing $C_{15}H_{24}$, a carbonate, an oxide, an oxalate, and two or more materials selected from the group consisting of a chloride and one or more transition metal source.

10. A process for forming a component comprising a plurality of cells (12), wherein the process comprises:

arranging the plurality of cells (12) in an arrangement; and filling a powder mixture (16) in interstitial gaps between the cells (12), wherein the powder mixture (16) is configured to dissipate heat and comprises $C_{15}H_{24}$, a carbonate, an oxide, an oxalate, and two or more materials selected from the group consisting of a chloride and one or more transition metal element source.

* * * * *